US009338375B2

(12) United States Patent
Mori

(10) Patent No.: US 9,338,375 B2
(45) Date of Patent: May 10, 2016

(54) IMAGING APPARATUS

(71) Applicant: CANON KABUSHIKI KAISHA, Tokyo (JP)

(72) Inventor: Taisei Mori, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 211 days.

(21) Appl. No.: 14/267,096

(22) Filed: May 1, 2014

(65) Prior Publication Data
US 2014/0332666 A1 Nov. 13, 2014

(30) Foreign Application Priority Data

May 13, 2013 (JP) .................................. 2013-101221
Mar. 17, 2014 (JP) .................................. 2014-053760

(51) Int. Cl.
*H04N 5/378* (2011.01)
*H04N 5/357* (2011.01)
*H04N 5/225* (2006.01)

(52) U.S. Cl.
CPC ........... *H04N 5/3572* (2013.01); *H04N 5/2254* (2013.01)

(58) Field of Classification Search
CPC ..... H04N 5/378; H04N 5/341; H04N 5/3572; H04N 5/2254
USPC ...................................................... 250/208.1
See application file for complete search history.

(56) References Cited

U.S. PATENT DOCUMENTS

| 5,060,059 | A | 10/1991 | Mori et al. | |
| 5,117,284 | A | 5/1992 | Mori et al. | |
| 5,253,048 | A | 10/1993 | Mori et al. | |
| 5,844,289 | A | 12/1998 | Teranishi et al. | |
| 8,203,622 | B2 * | 6/2012 | Pertsel | H04N 5/2354 348/222.1 |
| 8,330,857 | B2 | 12/2012 | Mori et al. | |
| 8,390,784 | B2 * | 3/2013 | Epple | G03F 7/70225 355/67 |
| 8,547,479 | B2 | 10/2013 | Mori et al. | |

FOREIGN PATENT DOCUMENTS

| JP | S61-280185 A | 12/1986 |
| JP | H08-191440 A | 7/1996 |
| JP | H09-312385 A | 12/1997 |
| JP | 2005-338341 A | 12/2005 |

* cited by examiner

*Primary Examiner* — Seung C Sohn
(74) *Attorney, Agent, or Firm* — Fitzpatrick, Cella, Harper & Scinto

(57) ABSTRACT

An imaging apparatus according to the present invention comprises: an image forming optical system; an image sensor including a plurality of pixels; an image fiber including a plurality of optical fibers that guides light from the image forming optical system to the image sensor; and a processing unit that applies processing for compensating for illumination unevenness of the image sensor caused by the image fiber, wherein at least some of the light propagating inside a first one of the optical fibers and at least some of the light propagating inside a second one of the optical fibers are guided to one of the pixels.

12 Claims, 15 Drawing Sheets

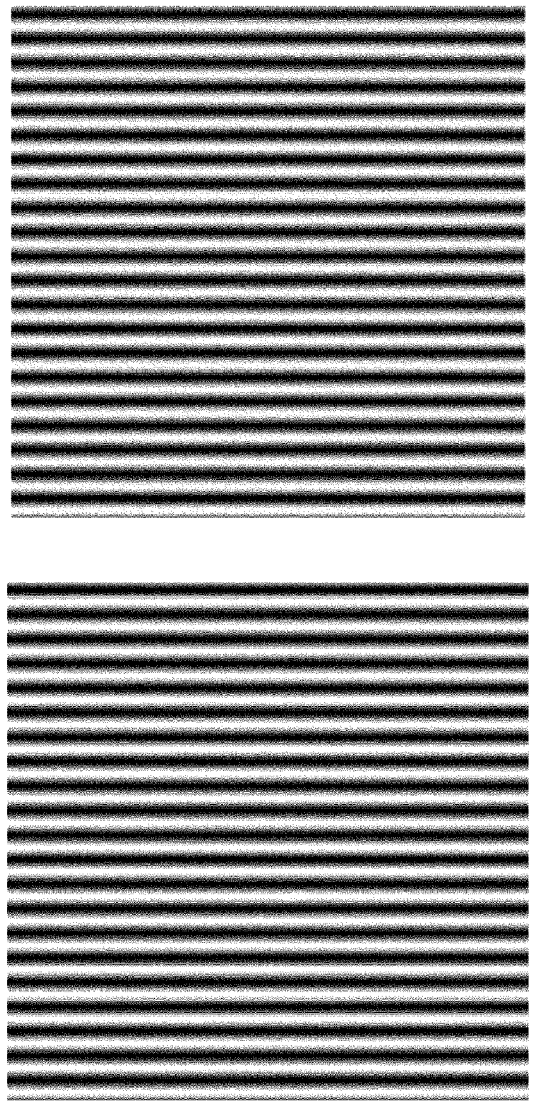
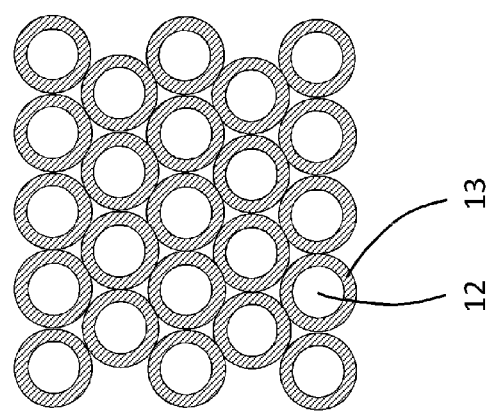
FIG.6C
FIG.6B
FIG.6A

IMAGING APPARATUS

BACKGROUND OF THE INVENTION

1. Field of the Invention

The present invention relates to an imaging apparatus that transmits light from an image forming optical system to an image sensor through an image fiber.

2. Description of the Related Art

There are various types of imaging apparatuses configured to transmit light from an image forming optical system through an image fiber and take an image with an image sensor. As seen in, for example, a fluorescent imaging apparatus, an industrial weak light detection apparatus, and an astronomical observation apparatus, there has been known technology to amplify weak light inside an image fiber and acquire a high brightness image, or the like. The image fiber is an optical unit capable of transmitting a two-dimensional optical image through a fiber flux having a plurality of optical fibers bundled together.

In an imaging apparatus configured to transmit light from an image forming optical system to an image sensor through an image fiber, the quality of a taken image is likely to be degraded due to various factors. Some methods have been known to improve the quality of such a degraded image. For example, when a difference in the refractive index between the core of an image fiber and a cladding portion is small, light seeps through the cladding portion, which causes a decrease in contrast. In order to address the problem, Japanese Patent Application Laid-open No. S61-280185 discloses a method in which light passing through a cladding portion is measured as light having average light intensity and the value of the light is subtracted from an entire screen to obtain a high contrast image. In addition, Japanese Patent Application Laid-open No. 2005-338341 discloses a method in which the interval between an image fiber and an image sensor in an optical axis direction is appropriately adjusted and the folding is reduced to allow the high quality of an image. Moreover, Japanese Patent Application Laid-open No. H9-312385 discloses a method in which the alignment direction of an image fiber and the alignment direction of an image sensor in a direction perpendicular to an optical axis are appropriately adjusted and moiré is reduced to allow the high quality of an image.

The present inventor has found the problem that the illumination unevenness of an image occurs, due to the fluctuation of the amount of received light for each of pixels, in an imaging apparatus configured to guide the light to an image sensor through an image fiber.

It seems that one of the reasons causing the fluctuation of the amount of the received light is attributable to a difference in the structure between the image fiber and the image sensor. In general, each of optical fibers constituting the image fiber and each of pixels constituting the image sensor are different in shape and size. For example, in many cases, the outgoing end face of the optical fiber is formed into a circle, and the pixel is formed into a rectangle. Therefore, it is difficult to make the optical fiber and the pixel correspond to each other on a one-to-one basis, and the positional relationship (overlapping degree) between the outgoing end face of the optical fiber and the pixel is different for each of the pixels. When the optical fiber is formed into a circle, a clearance is caused between the optical fibers even if the optical fibers are most densely bundled together. In addition, although the optical fiber includes a core and a cladding portion to efficiently transmit light, the cladding portion hardly allows the light to pass through. Accordingly, among an optical image formed by an image forming optical system, light formed at the clearances between the optical fibers or the cladding portions is not transmitted to the pixels of the image sensor. In other words, the illumination of the light guided to the image sensor is decreased by the clearances between the optical fibers and by the cladding portions, and the amount of the decrease in the illumination is different for each of the pixels depending on the positional relationship (overlapping degree) between the outgoing end face of the core of the optical fiber and the pixel. From the above reason, the output value of each of the pixels of the image sensor is fluctuated even if an image of a subject having even illumination is taken. This results in the occurrence of the illumination unevenness (brightness unevenness) of an image. Moreover, the intensity distribution of the light transmitted inside the optical fiber may not be even. In this case again, the illumination of the light received by the pixel is also different depending on the positional relationship between the outgoing end face of the optical fiber and the pixel, and thus illumination unevenness occurs.

SUMMARY OF THE INVENTION

The present invention has been made in view of the above circumstances and has an object of providing technology to further improve image quality in an imaging apparatus configured to guide light to an image sensor through an image fiber.

An imaging apparatus according to the present invention comprises: an image forming optical system; an image sensor including a plurality of pixels; an image fiber including a plurality of optical fibers that guides light from the image forming optical system to the image sensor; and a processing unit that applies processing for compensating for illumination unevenness of the image sensor caused by the image fiber, wherein at least some of the light propagating inside a first one of the optical fibers and at least some of the light propagating inside a second one of the optical fibers are guided to one of the pixels.

According to an embodiment of the present invention, it is possible to further improve image quality in an imaging apparatus configured to guide light to an image sensor through an image fiber.

Further features of the present invention will become apparent from the following description of exemplary embodiments with reference to the attached drawings.

BRIEF DESCRIPTION OF THE DRAWINGS

FIG. 6A is a diagram showing the structure of an image fiber;

FIG. 6B is a diagram showing an example of a compensation result in Example 2;

FIG. 6C is a diagram showing an example of a compensation result in Example 3;

DESCRIPTION OF THE EMBODIMENTS

Figure 1A:
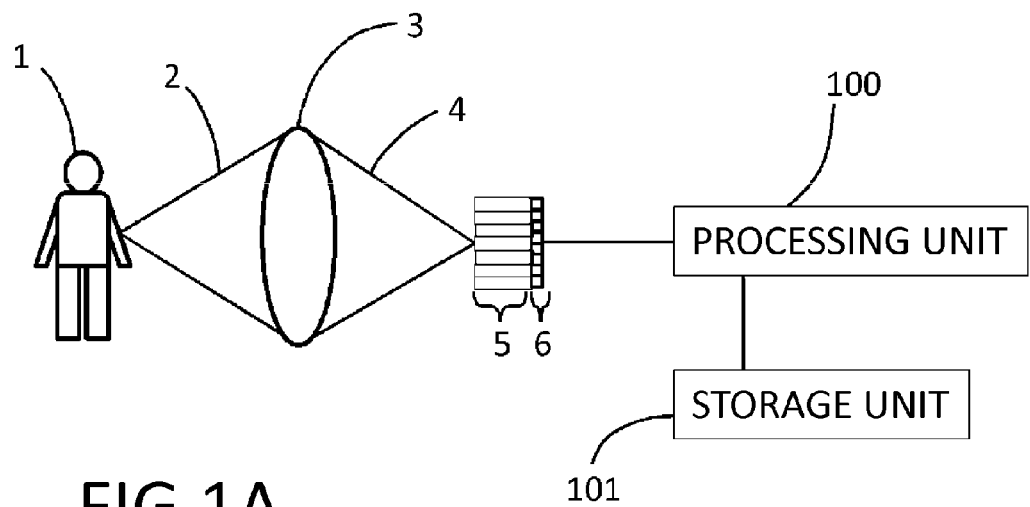
FIGS. 1A and 1B are schematic diagrams showing the configuration of an imaging apparatus.

The present invention relates to an imaging apparatus configured to guide light from an image forming optical system to an image sensor through an image fiber and specifically to technology to compensate illumination unevenness caused by the image fiber and obtain a high quality image. The illumination unevenness caused by the image fiber occurs since the degree of decrease in illumination caused by the image fiber is different for each of the pixels when the positional relationship between the outgoing end face of the core of an optical fiber constituting the image fiber and the pixel is different for each of the pixels. In order to improve the illumination unevenness, the present invention applies processing for compensating for the decrease in the illumination of each of the pixels caused by the image fiber to the output value of each of the pixels constituting the image sensor. Thus, the fluctuation of the degree of the decrease in the illumination of each of the pixels becomes small, whereby the illumination unevenness (brightness unevenness) of an image may be improved. As a method for compensating the output value, any method such as a method for multiplying the output value by a compensation value, a method for adding a compensation value to the output value, and a method for obtaining the output value compensated by a function or a look-up table (LUT) may be employed. In addition, as a method for determining (setting) the compensation value, any method may be employed. For example, the compensation value of each of the pixels may be determined on the basis of an output value obtained from each of the pixels when an image of a subject having known illumination distribution (such as a white board for calibration) is taken (the method is also called calibration or learning). Alternatively, the compensation value may be determined in such a way that the degree of the decrease in the illumination is estimated by calculation on the basis of the geometrical positional relationship between the optical fiber and the pixel. In any method, higher accuracy compensation may be expected when the compensation value is determined for each of imaging apparatuses. This is because, even in the case of the apparatuses of the same type, the positional relationship between the image fiber and the image sensor is different for each of the imaging apparatuses and illumination unevenness may occur in different ways in a narrow sense. However, if the difference between the apparatuses is vanishingly small, the same compensation value may be used between the same types or the same lots.

The present invention may be applied to any types of imaging apparatuses so long as they are configured to use an image fiber as an optical unit that guides light to an image sensor. For example, since a fluorescent imaging apparatus, an industrial weak light detection apparatus, and an astronomical observation apparatus each using weak light as a light source are capable of amplifying light inside an image fiber, they are preferred applicable examples of the present invention. In addition, when an image forming face is a non-flat face (curved face) as in a ball lens, an image fiber is effective as a method for guiding light from the image forming face serving as the non-flat face to an image sensor serving as a flat face. Therefore, such an imaging apparatus is also a preferred applicable example of the present invention.

Hereinafter, a description will be given in detail of preferred embodiments of the present invention with reference to the accompanying drawings.

First Embodiment

A first embodiment of the present invention will be described. In the first embodiment, a method for taking an image of a subject having known illumination distribution to determine the compensation value of each of pixels will be described.

FIG. 1A schematically shows the configuration of an imaging apparatus. Symbol 1 represents a subject whose image is to be taken. Symbol 2 represents a light flux emitted from one point of the subject 1. Symbol 3 represents an image forming optical system. Symbol 4 represents a light flux obtained by converging the light flux 2 through the image forming optical system 3. Symbol 5 represents an image fiber. Symbol 6 represents an image sensor. Symbol 100 represents a processing unit (processor) that applies image processing to image data obtained from the image sensor, and symbol 101 represents a storage unit that stores taken image data and parameters (such as compensation values and coefficients) for image processing.

An image of the light flux 2 emitted from the subject 1 is formed on the incoming end face of the image fiber 5 through the image forming optical system 3. The light propagates inside the image fiber 5, emitted from the outgoing end face of the image fiber 5, and received by the image sensor 6. Image data output from the image sensor 6 is stored in the storage unit 101 after being subjected to prescribed image processing by the processing unit 100.

The image fiber 5 is an optical unit capable of transmitting a two-dimensional optical image through a fiber flux having a plurality of optical fibers bundled together. The image sensor 6 is an image sensor having a plurality of pixels (photoelectric conversion devices) arranged in a two-dimensional pattern, and a charge coupled device (CCD) sensor, a complementary metal oxide semiconductor (CMOS) sensor, or the like may be used as such. The processing unit 100 is a unit that performs processing such as demosaicing, black correction, white balance, noise elimination, sharpness, brightness correction, color correction, combination, and compression coding. The processing unit 100 also performs the compensation of illumination unevenness caused by the image fiber 5. The processing provided by the processing unit 100 may appropriately be designed to suit the purposes and functions of the imaging apparatus. The processing unit 100 may be realized by a dedicated circuit such as an ASIC or by a computer and a program. As the storage unit 101, a non-volatile storage unit such as a semiconductor memory may preferably be used.

Figure 15:
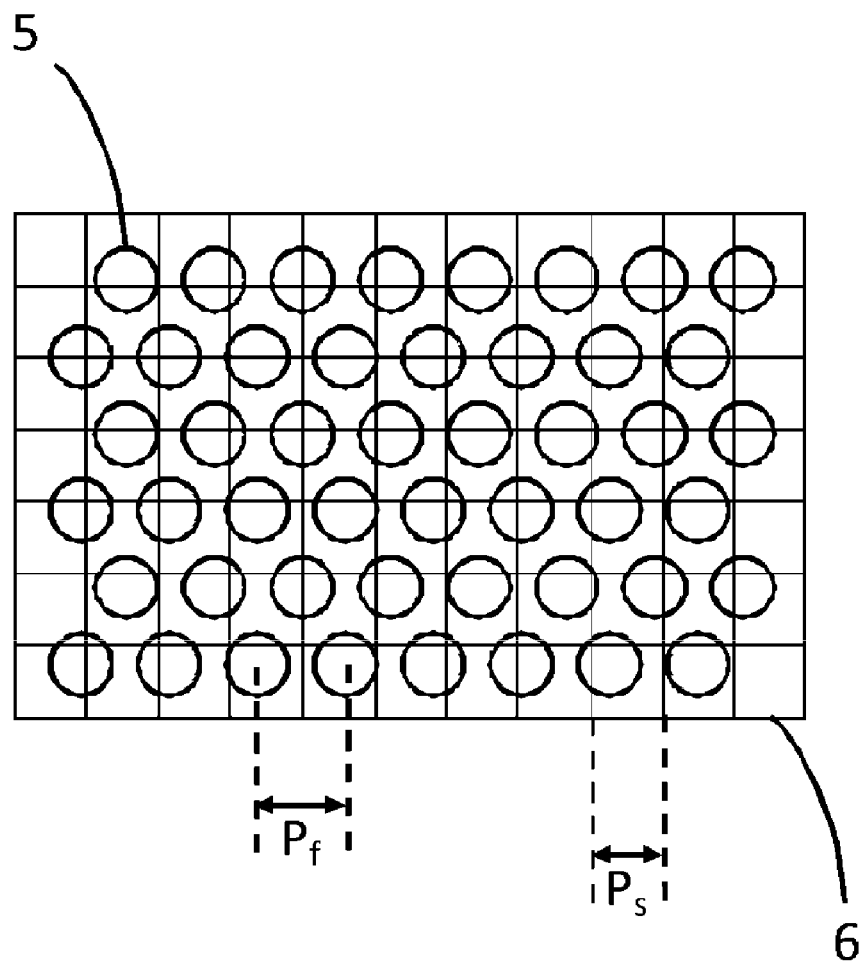
FIG. 15 is a schematic diagram showing the arrangement of the image sensor and the image fibers.

FIG. 15 shows a state of the image fiber 5 and the image sensor 6 when seen from the side of the image forming optical system 3. A pitch $P_f$ between the optical fibers of the image fiber 5 and a pitch $P_s$ between the pixels of the image sensor 6 satisfy the following formula (1). The resolution of the image sensor 6 is decreased when $P_f/P_s$ is less than 0.5, and the resolution of the image fiber 5 is decreased when $P_f/P_s$ is greater than 2.0. $P_f/P_s$ preferably satisfies the following formula (2), and $P_f/P_s$ is more preferably one.

$$0.5 \leq P_f/P_s \leq 2.0 \quad (1)$$

$$0.8 \leq P_f/P_s \leq 1.2 \quad (2)$$

With this configuration, one pixel of the image sensor 6 and the cores of the plurality of optical fibers of the image fiber 5 correspond to each other. That is, at least some of the light propagating inside one optical fiber and at least some of the light propagating inside another optical fiber are guided to one pixel of the image sensor 6.

In order to compensate illumination unevenness, it may be necessary to initially calculate a compensation value that compensates for decrease in the illumination of each of the pixels of the image sensor 6 caused by the image fiber 5 and store the calculated compensation value in the storage unit 101. The embodiment employs a method for taking an image of a subject having known illumination distribution to know the rate of the decrease in the illumination of each of the pixels. It may only be necessary to perform the operation once at the shipment of the imaging apparatus to a factory. After that, when the image of the subject is taken using the imaging apparatus, the processing unit 100 reads the compensation value from the storage unit 101 and compensates the output value of each of the pixels of the image sensor 6 to compensate for the decrease in the illumination caused by the image fiber 5.

Figure 1B:
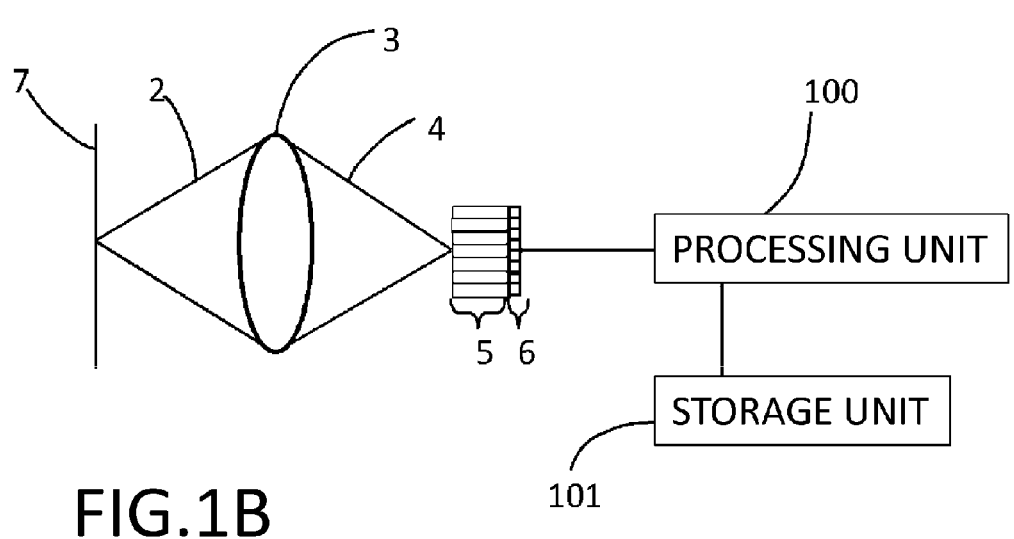

A procedure for setting a compensation value in the first embodiment will be described using FIGS. 1B and 2B. FIG. 1B schematically shows a state when an image of a subject 7 having known illumination distribution is taken, the subject 7 being prepared for setting a compensation value. In the embodiment, the subject 7 having even illumination over the entire face thereof (such as a white board) is used. This is because the ideal output value of each of the pixels when the image of the subject 7 having even illumination is taken (output value when decrease in the illumination is not caused) becomes the same and thus the decrease in the illumination caused by the image fiber 5 may be easily recognized. However, since it is possible to recognize the decrease in the illumination caused by the image fiber 5 if the illumination distribution is known in advance (i.e., if the ideal output value of each of the pixels is known in advance), the illumination of the subject 7 is not necessarily even.

Figure 2A:
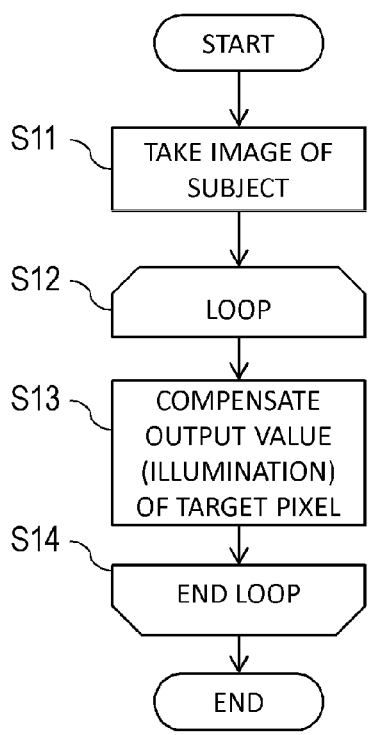
FIGS. 2A and 2B are flowcharts of processing for setting a compensation value and processing for compensating illumination unevenness according to a first embodiment.
Figure 2B:
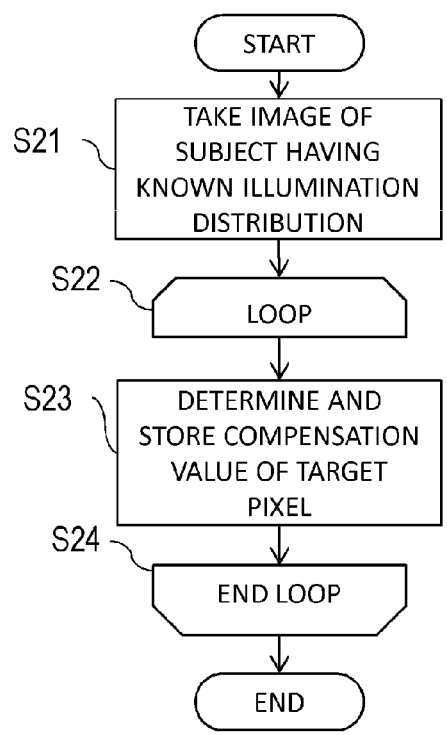

FIG. 2B is a flowchart of processing for setting a compensation value by the imaging apparatus. In step 21, the image of the subject 7 is taken, and the data of the output value of each of the pixels of the image sensor 6 is captured in the processing unit 100. In steps 22 to 24, the processing unit 100 performs processing for determining a compensation value on the basis of the output value of each of the pixels of the image sensor 6 and storing the determined compensation value in the storage unit 101 for all the pixels. Steps 22 and 24 show a loop for performing the processing on each of the pixels of the image sensor 6 one by one.

In step S23, a rate $I/I_0$ of an actually obtained output value (actual measurement value) I to an ideal output value $I_0$ of each of the pixels (output value in a case in which decrease in the illumination is not caused), i.e., the rate of the decrease in the illumination is calculated, and the rate $\Delta I$ ($=I/I_0$) of the decrease in the illumination is used as the compensation value. Note that $I_0$ becomes the same for all the pixels when the subject 7 having even illumination is used.

$$\Delta I(n) = \frac{I(n)}{I_0(n)} \quad \text{(Formula 1)}$$

n: pixel number of the image sensor (n=1, 2, ... nmax)
I(n): output value (actual measurement value) of the n-th pixel
$I_0(n)$: ideal output value of the n-th pixel
$\Delta I(n)$: compensation value of the n-th pixel
nmax: the number of pixels of the image sensor Next, a procedure for compensating illumination unevenness in the first embodiment will be described using FIGS. 1A and 2A. Compensation processing shown in FIG. 2A is processing performed by the processing unit 100 every time when an image of the subject 1 is taken. In step 11, the image of the subject 1 is taken, and the data of the output value of each of the pixels of the image sensor 6 is captured in the processing unit 100. In steps 12 to 14, the processing unit 100 performs processing for compensating the output value of each of the pixels using a compensation value stored in the storage unit 101 for all the pixels of the image sensor 6.

Figure 3A:
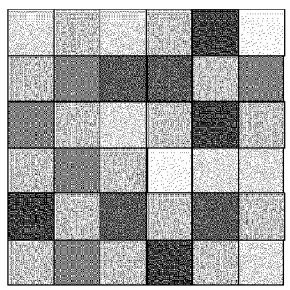
FIGS. 3A to 3C are schematic diagrams for describing the effect of compensating illumination unevenness.
Figure 3B:
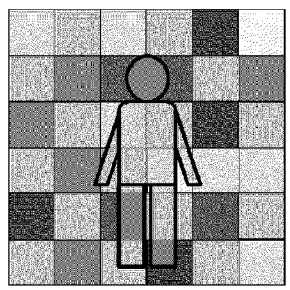
Figure 3C:
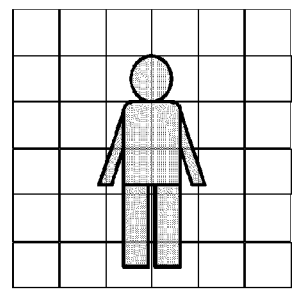

In step 13, an output value I of a pixel to be compensated is multiplied by a compensation value $\Delta I$ to compensate the output value (illumination) as in the following formula.

$$I_h(n) = \frac{I(n)}{\Delta I(n)} \quad \text{(Formula 2)}$$

n: pixel number of the image sensor (n=1, 2, ... nmax)
I(n): output value of the n-th pixel
$\Delta I(n)$: compensation value of the n-th pixel
$I_h(n)$: compensated output value of the n-th pixel
nmax: the number of pixels of the image sensor The effect of compensating illumination unevenness in the embodiment will be described using FIGS. 3A to 3C. FIG. 3A shows an image taken from the subject 7 having known illumination distribution, FIG. 3B shows an image taken from the desired subject 1, and FIG. 3C shows an image having compensated illumination unevenness. One square represents one pixel of the image sensor. Although 36 pixels (of six pixels by six pixels) are exemplified for convenience of diagrammatic representation, the imaging apparatus actually has several tens of thousands to several million pixels.

As described above, when the image of the subject 7 having even illumination is taken, it is assumed that the output values of all the pixels are ideally the same. However, illumination unevenness as shown in FIG. 3A occurs due to decrease in the illumination of each of the pixels caused by the image fiber 5. In addition, when the image of the desired subject 1 is taken, it is caused to have illumination unevenness in its entirety by the image fiber 5 as shown in FIG. 3B. Therefore, the image shown in FIG. 3B is compensated using compensation values (rates of the decrease in the illumination of the pixels) calculated from the image shown in FIG. 3A. FIG. 3C shows the result of the compensation and represents an improvement in the illumination unevenness.

Note that although it is desirable to perform the compensation to entirely eliminate the illumination unevenness, it is actually difficult to zero the illumination unevenness due to compensation errors and noise influence. According to experiment by the present inventor, it has been found that illumination unevenness may hardly be detected if the compensated illumination of each of the pixels of the image sensor falls within ±10% of an average of the compensated illumination of all the pixels. That is, the illumination of each of the pixels is preferably compensated in such a way that the compensated illumination of each of the pixels of the image sensor falls within ±10% of an average of the compensated illumination of all the pixels when the image of the subject 7 having even illumination is taken.

Example 1

The effectiveness of compensating illumination unevenness in the first embodiment was verified in a simulation. In the following simulation, an imaging apparatus and a subject are modeled, and calculation is made by a calculator so as to be closely analogous to ideal conditions. However, a difference in the result between the modeled imaging apparatus and an actual imaging apparatus is small.

Figure 4C:
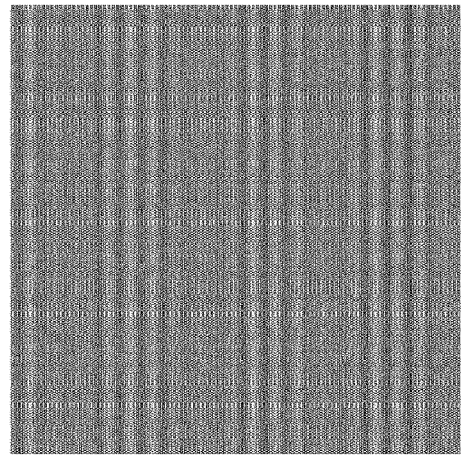
FIGS. 4A to 4C are diagrams for describing pixel arrangement and illumination unevenness in Example 1.
Figure 4B:
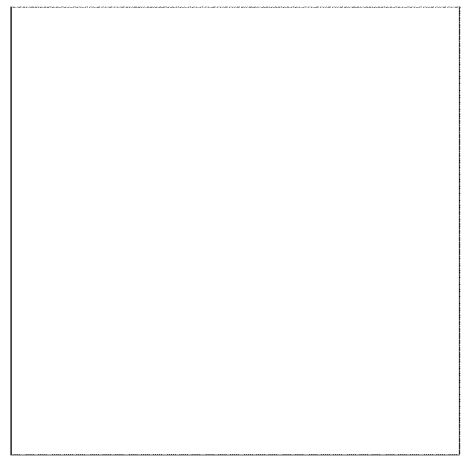
Figure 4A:
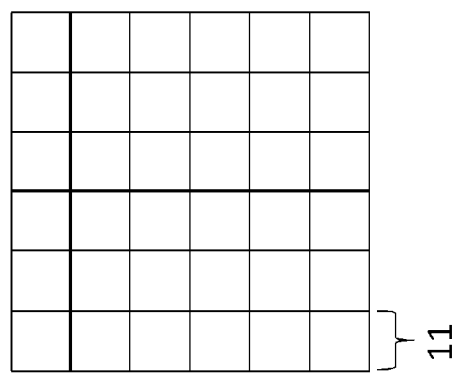

As the image of the subject 7 having known illumination distribution, a white image having evenness over the entire face thereof as shown in FIG. 4B is used. In addition, the image forming optical system 3 is an ideal lens, and the effect of the image forming optical system 3 is not taken into consideration with the assumption that an image of a subject may be formed at the entrance of the image fiber without the degradation of image quality. That is, the image data of a subject is directly used as a value input to the image fiber 5. Moreover, the image sensor 6 has a structure in which the pixels are densely arranged in a two-dimensional pattern as shown in FIG. 4A. Symbol 11 represents one pixel of the image sensor 6. The pixel 11 is formed into a square, and the length of one side of the pixel 11 is called a pixel size. The above conditions are common to all the following Examples. Unless otherwise indicated, it is assumed that each of the pixels of the image sensor 6 is an ideal one capable of receiving the light of all wavelengths corresponding to the three colors of R (red), G (green), and B (blue), and parameters shown in table 1 were used.

TABLE 1

| | |
|---|---|
| The number of pixels of subject image data (vertical × horizontal) | 920 × 920 |
| The number of pixels of the image sensor (vertical × horizontal) | 920 × 920 |
| Pixel size of the image sensor (μm) | 1.55 |

The occurrence of illumination unevenness caused by the image fiber 5 was expressed in such a way that the illumination of each of the pixels 11 of the image sensor 6 was randomly decreased. FIG. 4B shows the image of the subject 7 having known illumination distribution, and the illumination of the n-th pixel is $I_{in}(n)=1.0$. FIG. 4C shows an image obtained when the image shown in FIG. 4B is taken by the imaging apparatus (output value of each of the pixels 11 of the image sensor 6). It seems that the entire image is darkened due to decrease in the illumination caused by the image fiber. In addition, it seems that the illumination unevenness occurs and the image quality is degraded since the rate of the decrease in the illumination is different. The illumination $I_c(n)$ ($=\Delta I(n)$) of the n-th pixel of the image shown in FIG. 4C is stored.

Figure 5C:
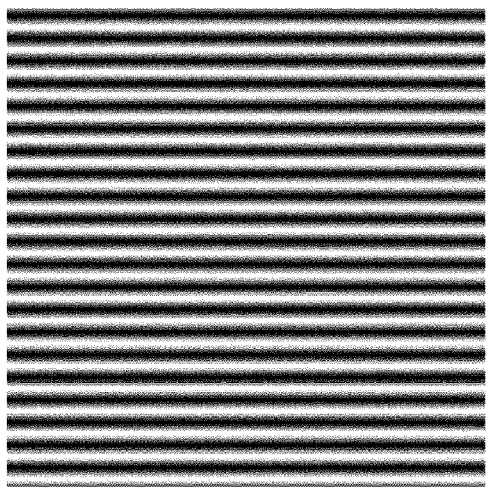
FIGS. 5A to 5C are diagrams showing an example of illumination unevenness and compensation results in Example 1.
Figure 5B:
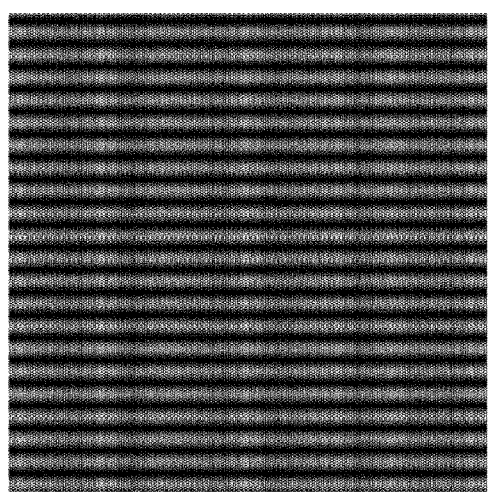
Figure 5A:
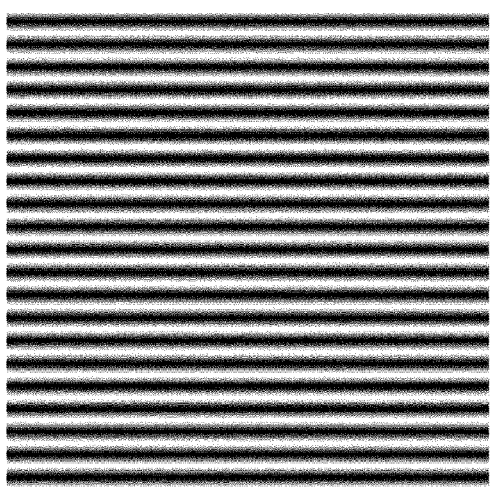

Next, a sinusoidal chart shown in FIG. 5A was used as the desired subject 1. FIG. 5B shows an image obtained when the image of FIG. 5A is taken by the imaging apparatus. It seems that the entire image shown in FIG. 5B is darkened due to decrease in the illumination caused by the image fiber 5 and the image quality is degraded due to illumination unevenness. The illumination I(n) of the n-th pixel of the image shown in FIG. 5B is stored. FIG. 5C shows an image obtained when the illumination I(n) of the n-th pixel of the image shown in FIG. 5B is compensated by $I_h(n)=I_{in}(n)/I_c(n)\times I(n)$ ($=I(n)/\Delta I(n)$). Compared with the image shown in FIG. 5B, it seems that the illumination unevenness of the image shown in FIG. 5C is eliminated. In this simulation, the output values of all the pixels of the image shown in FIG. 5C matched those of the image shown in FIG. 5A. From this result, the effectiveness of compensating illumination unevenness in the first embodiment was verified.

Example 2

In Example 1, it was assumed that the illumination was randomly decreased by the image fiber. Conversely, in Example 2, the decrease in the illumination and the illumination unevenness are simulated by calculation in consideration of the shape of the image fiber. As shown in FIG. 6A, the image fiber has a structure in which the circular optical fibers are most densely arranged when seen from the direction of an optical axis. Symbol 12 represents the core of the optical fiber, and symbol 13 represents the cladding portion of the optical fiber. Light is not allowed to pass through portions other than the cores 12. It was assumed that an image of a subject was formed at the entrance of the image fiber 5 and the light of the optical image corresponding to areas overlapping with the incoming end faces of the cores 12 was taken inside the image fiber 5. In addition, it was assumed that the taken light propagated so as to keep its even light intensity distribution inside the image fiber 5 and output from the exit of the image fiber 5. Moreover, it was assumed that the pixels 11 of the image sensor 6 received the light corresponding to the areas overlapping with the outgoing end faces of the cores 12. Here, the overlaps between the end faces of the cores 12 and the pixels represent overlaps in a case in which the end faces of the cores 12 and the (light receiving portions) of the pixels are each projected on a projection face orthogonal to the optical axes of the optical fibers.

The image fiber having the configuration shown in FIG. 6A is used in all the following Examples. Parameters shown in table 2 were used.

TABLE 2

| | |
|---|---|
| The number of pixels of image data of subject (vertical × horizontal) | 920 × 920 |
| The number of pixels of the image sensor (vertical × horizontal) | 920 × 920 |
| Pixel size of the image sensor (μm) | 1.55 |
| Radius of core of image fiber (μm) | 1.2 |
| Radius of cladding portion of image fiber (μm) | 1.5 |

FIG. 6B shows an image having compensated illumination unevenness obtained when calculation is made in the same procedure as that of Example 1. The output values of all the pixels of the image shown in FIG. 6B matched those of the image shown in FIG. 5A, and the effectiveness of compensating illumination unevenness in the first embodiment was verified.

Example 3

Next, a simulation was performed with the assumption that an unexpected error occurred at the compensation of illumination unevenness. Although the same calculation conditions as those of Example 2 were set, an error of less than or equal to 10% randomly occurred at the compensation of the output value of each of the pixels. That is, the n-th pixel was compensated as $I_h(n)=e_n \times I_{in}(n)/I_c(n) \times I(n)$. However, $e_n$ represents a random number satisfying $0.9 \leq e_n \leq 1.1$. FIG. 6C shows an image having compensated illumination unevenness in a case in which an error occurred. Compared with the image having no error shown in FIG. 6B, the image shown in FIG. 6C has more illumination unevenness left therein corresponding to the error occurring at the compensation of the output value of each of the pixels. However, the quality of the obtained image is satisfactory under person's visual observation.

Second Embodiment

Next, the compensation of illumination unevenness according to a second embodiment of the present invention will be described. In the first embodiment, a compensation value is set for each of the pixels on the basis of an output value obtained from each of the pixels when an image of a subject having known illumination distribution is taken by the imaging apparatus. In the second embodiment, however, a compensation value is set by calculation on the basis of the overlapping rate between the outgoing end face of the core of the optical fiber and the pixel. Since configurations other than the above are the same as those of the first embodiment, their detailed descriptions will be omitted. The method of the second embodiment may preferably be applied when the shape and arrangement of the optical fibers constituting the image fiber 5 and the shape and arrangement of the pixels of the image sensor 6 are all known.

In processing for setting a compensation value according to the embodiment, the processing unit 100 acquires (reads), in step 21 of FIG. 2B, information on the shapes and arrangements of the image fiber 5 and the image sensor 6 instead of taking the image of the subject 7 having known illumination distribution. As the information, design information (such as CAD information) on the imaging apparatus or the like may be used. Then, in step 23 of FIG. 2B, the processing unit 100 calculates the overlapping area between each of the pixels of the image sensor 6 and the outgoing end face of the core of the image fiber 5. Here, a rate $S_f/S_s$ of a total overlapping area $S_f$ between the pixel and the outgoing end face of the core to an area $S_s$ of the pixel, i.e., a light receiving rate is calculated, and the light receiving rate $\Delta S(=S_f/S_s)$ is used as the compensation value. Processing other than the above is the same as that of the first embodiment.

$$\Delta S(n) = \frac{S_f(n)}{S_s(n)} \quad \text{(Formula 3)}$$

n: pixel number of the image sensor (n=1, 2, . . . nmax)
$S_f(n)$: total overlapping area between the n-th pixel and outgoing end face of core
$S_s(n)$: area of the n-th pixel
$\Delta S(n)$: compensation value of the n-th pixel
nmax: the number of pixels of the image sensor Note that the above formula is based on the premise that the light receiving rate and the output value (illumination) of the pixel are in a linear relationship. However, when the light receiving rate and the output value of the pixel are in a non-linear relationship, the compensation value may be determined from the area $S_f$ or the light receiving rate $\Delta S$ using a function, a look-up table (LUT), or the like.

Figure 7:
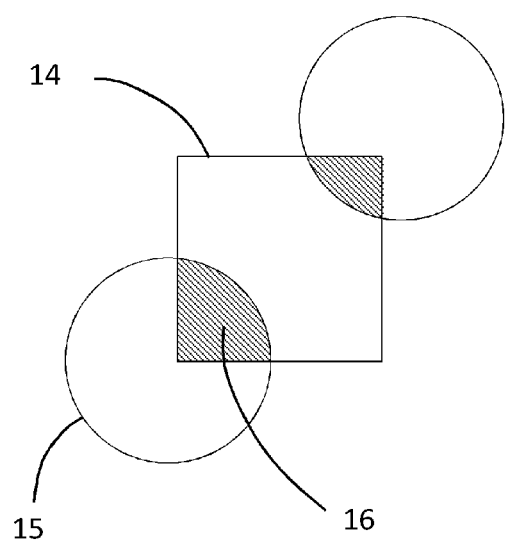
FIG. 7 is a schematic diagram for describing the overlaps between the cores of optical fibers and a pixel according to a second embodiment.

FIG. 7 shows a state in which the cores of the image fiber 5 and the pixel of the image sensor 6 overlap each other. Symbol 14 represents the pixel of the image sensor 6 when seen from the direction of the optical axis, and symbol 15 represents the outgoing end face of the core of each of the optical fibers constituting the image fiber 5 when seen from the direction of the optical axis. The shaded area of symbol 16 represents the overlap between the outgoing end face of the core of the optical fiber and the pixel of the image sensor. The overlap 16 represents the overlap in a plane orthogonal to the optical axis, i.e., the overlap between the outgoing end face of the core and the pixel on a projection face in a case in which the outgoing end face of the core and the pixel are projected on the projection face orthogonal to the optical axis. When a target pixel overlaps with the cores of a plurality of optical fibers, the total overlapping area $S_f$ represents the sum of the overlapping areas between the target pixel and the cores of all the optical fibers. In the example of FIG. 7, the sum of the two shaded areas represents the total overlapping area $S_f$.

A procedure for compensating illumination unevenness performed when the image of the desired subject 1 is taken is the same as that of the first embodiment (see FIG. 2A) except that the compensation value used in step 13 is $\Delta S$ determined by the above formula.

In the embodiment, the illumination of each of the pixels is preferably compensated in such a way that the compensated illumination of each of the pixels of the image sensor falls within ±10% of an average of the compensated illumination of all the pixels when an image of a subject having even illumination is taken.

Example 4

The effectiveness of compensating illumination unevenness in the second embodiment was verified in a simulation. The calculation conditions of Example 4 are the same as those of Example 2.

Figure 8A:
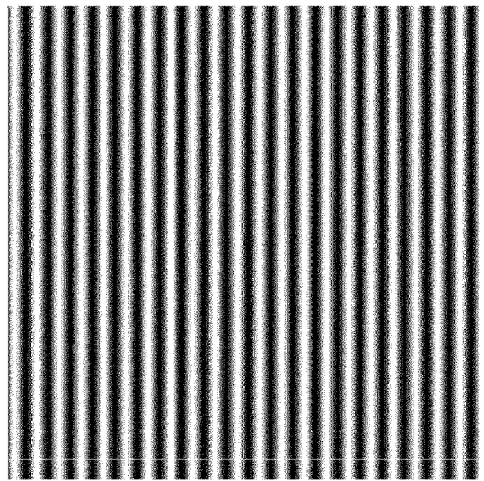
FIG. 8A is a diagram showing an example of a compensation result in Example 4.

The compensation value of each of the pixels was determined on the basis of the overlapping area between the outgoing end face of the core of the optical fiber and the pixel of the image sensor, and the compensation of illumination unevenness was performed using the compensation value. FIG. 8A shows an image having compensated illumination unevenness. In this simulation, the output values of all the pixels of the image shown in FIG. 8A matched those of the image shown in FIG. 5A. From this result, the effectiveness of compensating illumination unevenness in the second embodiment was verified.

Example 5

Figure 8B:
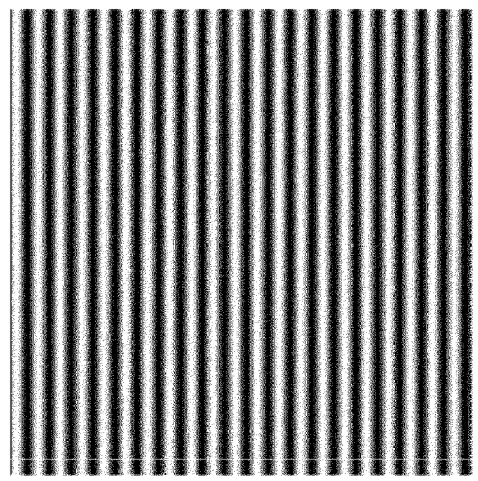
FIG. 8B is a diagram showing an example of a compensation result in Example 5.

Next, a simulation was performed with the assumption that an unexpected error occurred at the compensation of illumination unevenness. Although the same calculation conditions as those of Example 4 were set, an error of less than or equal to 10% randomly occurred at the compensation of the output value of each of the pixels. That is, the n-th pixel was compensated as $I_h(n)=e_n \times S_s(n)/S_f(n) \times I(n)$. However, $e_n$ represents a random number satisfying $0.9 \leq e_n \leq 1.1$. FIG. 8B shows an image having compensated illumination unevenness in a case in which an error occurred. Compared with the image having no error shown in FIG. 8A, the image shown in FIG. 8B has more illumination unevenness left therein corresponding to the error occurring at the compensation of the output value of each of the pixels. However, the quality of the obtained image is satisfactory under person's visual observation.

Third Embodiment

Next, the compensation of illumination unevenness according to a third embodiment of the present invention will be described. In the first embodiment, the illumination of a target pixel is compensated using the output value and the compensation value of the target pixel. In the third embodiment, however, the illumination of a target pixel is compensated using not only the output value of the target pixel but the output values of pixels adjacent to the target pixel (also called adjacent pixels or neighboring pixels). The purpose of using the output values of the adjacent pixels is to estimate the amount of decrease in the illumination of the target pixel caused by the image fiber (i.e., amount of light blocked by the clearances between the optical fibers or by the cladding portions of the optical fibers) using the output values of the adjacent pixels.

Figure 9:
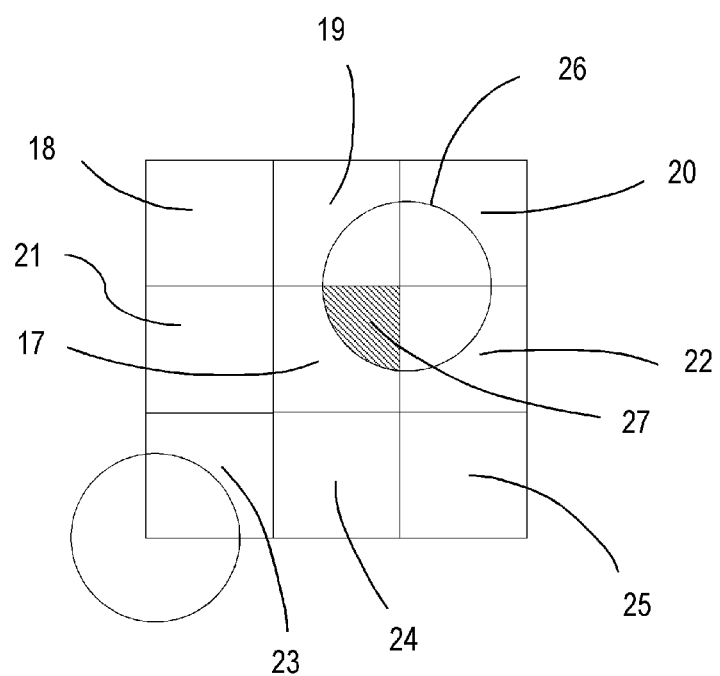
FIG. 9 is a schematic diagram for describing the overlaps between the cores of the optical fibers and the pixels according to a third embodiment.

The compensation of illumination unevenness according to the embodiment will be described diagrammatically. FIG. 9 shows the image fiber and the image sensor when seen from the direction of the optical axis. Symbol 17 represents a target pixel of the image sensor whose illumination is to be compensated, and symbols 18, 19, 20, 21, 22, 23, 24, and 25 represent the adjacent pixels of the target pixel 17. Pixels used to compensate the illumination of the target pixel 17 may be the eight adjacent pixels 18 to 25 or the four adjacent pixels 19, 21, 22, and 24. Symbol 26 represents the optical fiber overlapping with the target pixel 17, and symbol 27 represents the overlapping area between the target pixel 17 and the optical fiber 26 in a plane orthogonal to the optical axis. The target pixel 17 receives light transmitted from the optical fiber 26. However, the illumination of the target pixel 17 is decreased since the light is blocked in areas other than the overlapping area 27. Further, since the amount of the decrease in the illumination is different for each of the pixels, illumination unevenness occurs in the entire image sensor. The decrease in the illumination and the illumination unevenness are compensated using the output value of the target pixel and the output values of a group of the adjacent pixels.

The compensation is performed by roughly two methods. A first method is a two-stage compensation method in which the compensation described in another embodiment (i.e., compensation using only the output value of the target pixel) is applied to all the pixels to perform an initial compensation and then final compensated illumination is obtained using the compensated illumination of the target pixel and the compensated illumination of adjacent pixels. As a method for calculating the final compensated illumination, a method like demosaicing processing, a method for averaging (weighting and averaging) the compensated illumination of the target pixel and the compensated illumination of the adjacent pixels, or the like may be used.

A second method is a method in which the final compensated illumination is obtained from the output value of the target pixel and the output values of the adjacent pixels. For example, final compensated illumination $I_h$ may be calculated as in the following formula. That is, a value $I_d$ obtained by interpolating the output values of a plurality of adjacent pixels is multiplied by a coefficient C corresponding to the target pixel to determine a compensation value used to compensate for decrease in the illumination of the target pixel, and the compensation value ($C \times I_d$) is added to an output value I of the target pixel. For the calculation of the value $I_d$, any interpolation method such as nearest neighbor interpolation, linear interpolation, secondary interpolation, polynomial interpolation, cubic interpolation, and spline interpolation may be used.

$$I_h(n) = I(n) + C(n) \times I_d(n) \quad \text{(Formula 4)}$$

n: pixel number of the image sensor (n=1, 2, . . . , nmax)
I(n): output value of the n-th pixel
C(n): coefficient corresponding to the n-th pixel
$I_d(n)$: value obtained by interpolating output values of pixels adjacent to the n-th pixel
$I_h(n)$: compensated output value of the n-th pixel
nmax: the number of pixels of the image sensor Note that the coefficient C corresponding to the target pixel may be determined according to the rate of the decrease in the illumination of the target pixel. Specifically, the coefficient C may be set such that it becomes smaller as the rate of the decrease in the illumination is smaller and becomes greater as the rate of the decrease in the illumination is greater. For example, the coefficient C as shown in the following formula may preferably be used. Here, $\Delta I$ represents the rate of the decrease in the illumination described in the first embodiment.

$$C(n) = 1 - \Delta I(n) \quad \text{(Formula 5)}$$

n: pixel number of the image sensor (n=1, 2, . . . , nmax)
$\Delta I(n)$: rate of decrease in illumination of the n-th pixel
C(n): coefficient corresponding to the n-th pixel
nmax: the number of pixels of the image sensor In the embodiment, the illumination of each of the pixels is preferably compensated in such a way that the compensated illumination of each of the pixels of the image sensor falls within ±10% of an average of the compensated illumination of all the pixels when an image of a subject having even illumination is taken.

As described in the second embodiment, the overlapping area between the target pixel and the optical fiber (core) is correlated with the rate of the decrease in the illumination of the target pixel. Therefore, the coefficient C may be determined according to the overlapping area between the target pixel and the optical fiber. In this case, the coefficient C may be set such that it becomes smaller as the overlapping area is greater and becomes greater as the overlapping area is smaller. For example, the coefficient C as shown in the following formula may preferably be used. Here, $\Delta S$ represents the light receiving rate described in the second embodiment.

$$C(n) = 1 - \Delta S(n) \quad \text{(Formula 6)}$$

n: pixel number of the image sensor (n=1, 2, . . . , nmax)
$\Delta S(n)$: light receiving rate of the n-th pixel
C(n): coefficient corresponding to the n-th pixel
nmax: the number of pixels of the image sensor

Example 6

The effectiveness of compensating illumination unevenness in the third embodiment was verified in a simulation. Parameters shown in table 3 were used.

TABLE 3

| | |
|---|---|
| The number of pixels of image data of subject (vertical × horizontal) | 920 × 920 |
| The number of pixels of the image sensor (vertical × horizontal) | 920 × 920 |
| Pixel size of the image sensor (μm) | 1.55 |
| Radius of core of image fiber (μm) | 3.0 |
| Radius of cladding portion of image fiber (μm) | 4.0 |

Figure 10C:
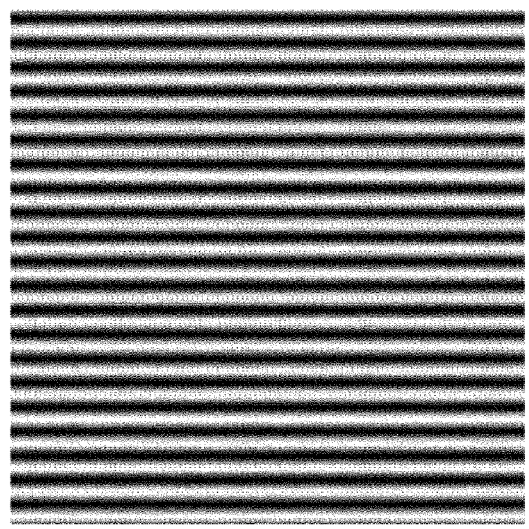
FIG. 10C is a diagram showing an example of a compensation result in Example 7.
Figure 10B:
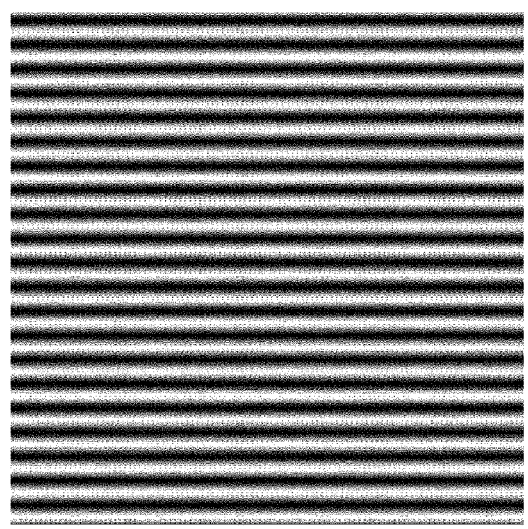
FIG. 10B is a diagram showing an example of a compensation result in Example 6.
Figure 10A:
FIG. 10A is a diagram showing an example of a compensation result according to the first embodiment.

FIG. 10A shows the image having compensated illumination unevenness obtained by the calculation of the first embodiment. FIG. 10B shows an image having compensated illumination unevenness obtained by the calculation of the third embodiment (i.e., using the output value of the target pixel and the output values of the adjacent pixels). The image shown in FIG. 10B is more similar to the original image (shown in FIG. 5A) than the image shown in FIG. 10A. According to evaluation by structural similarity (SSIM), the image shown in FIG. 10A is about 0.37 while the image shown in FIG. 10B is about 0.61, showing that the image shown in FIG. 10B is more similar to the subject. For the SSIM, the following formula was used. Since the subject is expressed in a gray scale, the same evaluation result is obtained regardless of the colors of red (R), green (G), and blue (B).

$$SSIM = \frac{(2\mu_1\mu_2 + C)(2\sigma_{12} + D)}{(\mu_1^2 + \mu_2^2 + C)(\sigma_1^2 + \sigma_2^2 + D)} \quad \text{(Formula 7)}$$

Here, $\mu_1$ represents a value obtained by averaging the gradation of an image of a subject over all the pixels, and $\mu_2$ represents a value obtained by averaging the gradation of an image having compensated illumination unevenness over all the pixels. $\sigma_1$ represents the standard deviation of the gradation of the image of the subject over all the pixels, $\sigma_2$ represents the standard deviation of the gradation of the image having compensated illumination unevenness over all the pixels, and $\sigma_{12}$ represents the standard deviation of the product of the gradation of the image of the subject and the gradation of the image having compensated illumination unevenness over all the pixels. In addition, the values C=6.5 and D=58.5 were used.

Example 7

Next, a simulation was performed with the assumption that an unexpected error occurred at the compensation of illumination unevenness. Although the same calculation conditions as those of Example 6 were set, an error of less than or equal to 10% randomly occurred at the compensation of the output value of each of the pixels. That is, the n-th pixel was compensated as $I_h(n)=e_n \times (I(n)+C(n)\times I_d(n))$. However, $e_n$ represents a random number satisfying $0.9 \leq e_n \leq 1.1$. FIG. 10C shows an image having compensated illumination unevenness in a case in which an error occurred. Compared with the image having no error shown in FIG. 10B, the image shown in FIG. 10C has more illumination unevenness left therein corresponding to the error occurring at the compensation of the output value of each of the pixels. However, the quality of the obtained image is satisfactory under person's visual observation.

Fourth Embodiment

Figure 11:
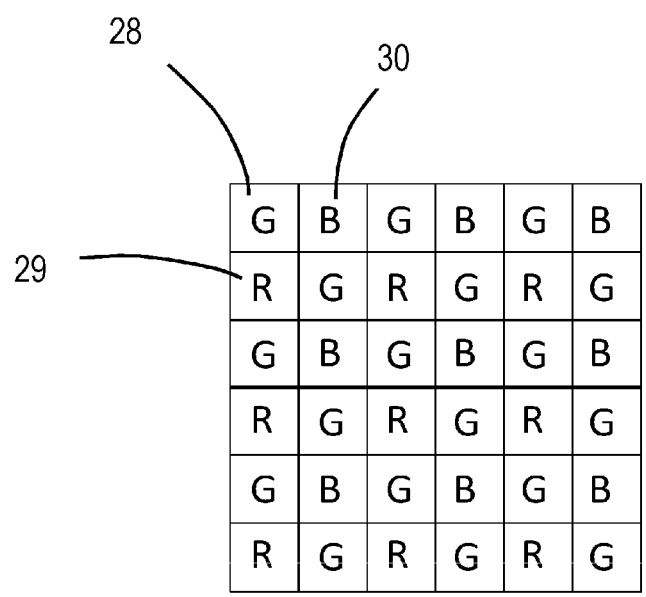
FIG. 11 is a schematic diagram showing the color filter of the image sensor according to a fourth embodiment.

Next, the compensation of illumination unevenness according to a fourth embodiment of the present invention will be described. The fourth embodiment will describe the compensation of illumination unevenness in a case in which the image sensor has a color filter and each of the pixels receives only any of the three colors of red (R), green (G), and blue (B). FIG. 11 is a schematic diagram showing the pixel configuration of the image sensor. Symbol 28 represents a pixel that receives the light of green (G), symbol 29 represents a pixel that receives the light of red (R), and symbol 30 represents a pixel that receives the light of blue (B) (hereinafter abbreviated as a G pixel, an R pixel, and a B pixel, respectively). A Bayer arrangement is shown in FIG. 11, but the arrangement of a color filter is not limited to the Bayer arrangement. In addition, a color filter of two colors or four or more colors other than the three colors of R, G, and B may be used.

Figure 12:
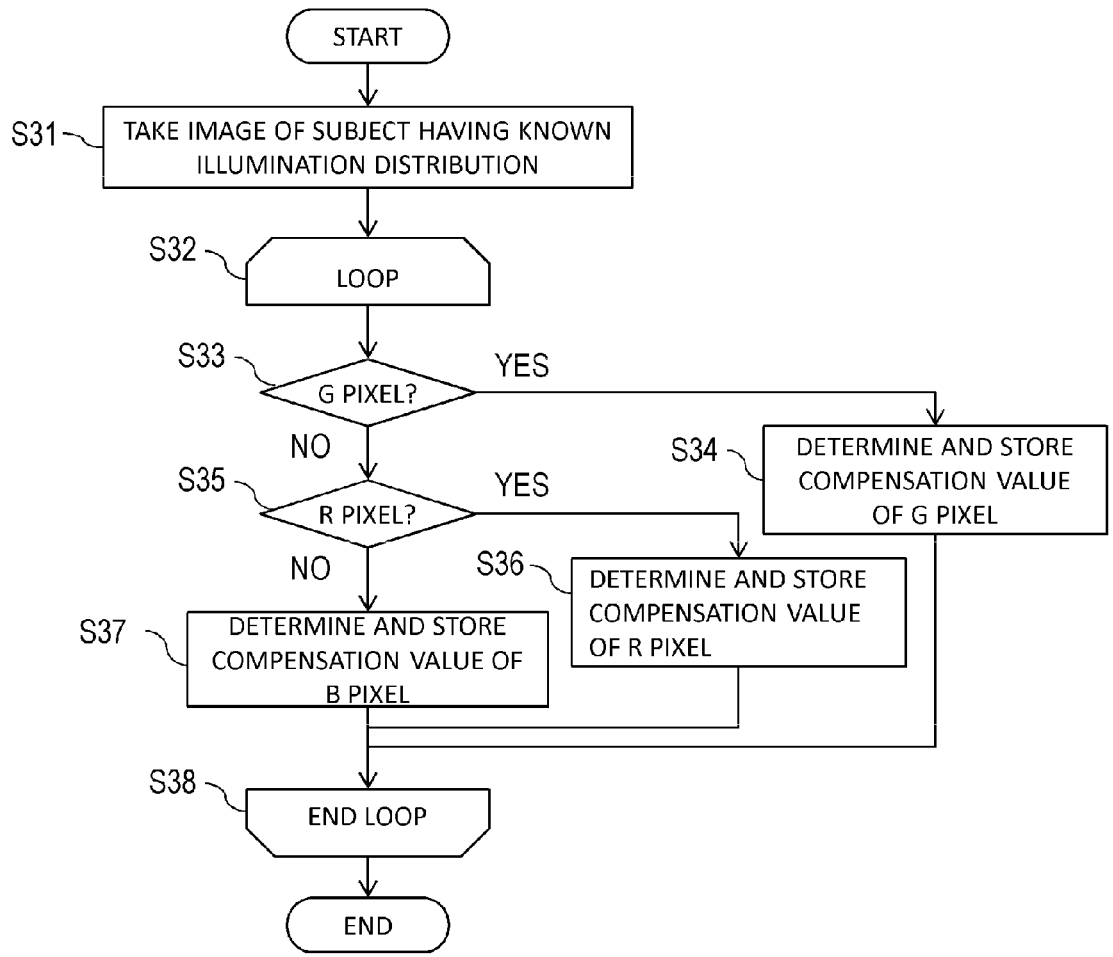
FIG. 12 is a flowchart of processing for setting a compensation value according to the fourth embodiment.

FIG. 12 is a flowchart of processing for setting compensation values in a case in which the image sensor has a color filter. It is only necessary to perform the processing once at the manufacturing of the imaging apparatus. In step 31, an image of a subject (such as a white board) having known illumination distribution is taken. By the loop of steps 32 and 38, the processing of steps 33 to 37 is performed on each of the pixels of the image sensor. In step 33, the processing unit 100 determines whether a target pixel is a G pixel and then proceeds to step 34 if the target pixel is the G pixel or proceeds to step 35 if the target pixel is not the G pixel. In step 34, the processing unit 100 calculates the rate of decrease in the illumination of the target pixel (G pixel) and stores the value in the storage unit 101 as the compensation value of the target pixel. A specific calculation method is the same as that described in the above embodiment. In step 35, the processing unit 100 determines whether a target pixel is an R pixel and then proceeds to step 36 if the target pixel is the R pixel or proceeds to step 37 if the target pixel is not the R pixel. In step 36, the processing unit 100 calculates the rate of decrease in the illumination of the target pixel (R pixel) and stores the value in the storage unit 101 as the compensation value of the target pixel. In step 37, the processing unit 100 calculates the rate of decrease in the illumination of a target pixel (B pixel) and stores the value in the storage unit 101 as the compensation value of the target pixel. Although the compensation values are determined by the same calculation formula regardless of the colors of the pixels in the embodiment, the method for determining the compensation values may be different for each of the colors. This is because the transmittance of the color filter, the light receiving characteristics of the pixels, or the like may be different for each of the colors. In addition, like the second embodiment, the compensation values may be determined from the overlapping areas between the cores of the optical fibers and the pixels.

In the embodiment, the illumination of each of the pixels is preferably compensated in such a way that compensated white illumination expressed by the R, G, and B pixels of the image sensor falls within ±10% of an average of the compensated illumination of all the pixels when an image of a white subject (such as a white board) having even illumination is taken.

In addition, the illumination of the R pixels is preferably compensated in such a way that the compensated illumination of the R pixels of the image sensor falls within ±10% of an average of the compensated illumination of all the R pixels when an image of a red subject having even illumination is taken.

Further, the illumination of the G pixels is preferably compensated in such a way that the compensated illumination of the G pixels of the image sensor falls within ±10% of an average of the compensated illumination of all the G pixels when an image of a green subject having even illumination is taken.

Further, the illumination of the B pixels is preferably compensated in such a way that the compensated illumination of the B pixels of the image sensor falls within ±10% of an average of the compensated illumination of all the B pixels when an image of a blue subject having even illumination is taken.

Figures 13A, 13B:
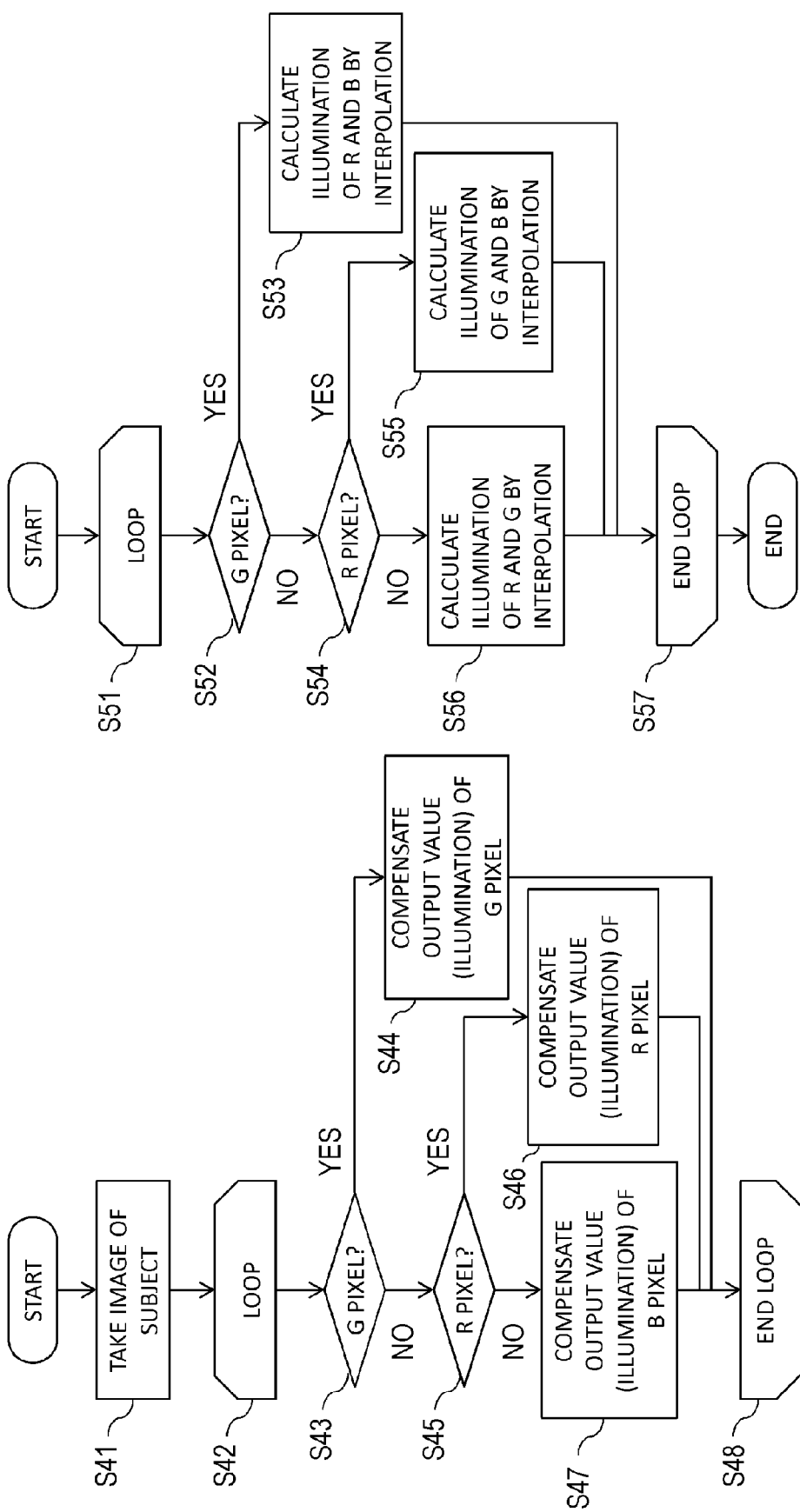
FIGS. 13A and 13B are flowcharts of processing for compensating illumination unevenness according to the fourth embodiment.

FIG. 13A is a flowchart of processing for compensating illumination unevenness in a case in which the image sensor has a color filter. The processing is performed every time an image is taken. In the processing shown in FIG. 13A, only the illumination of a color of light received by each of the pixels is compensated. In step 41, an image of a subject is taken. In the loop of steps 42 and 48, the processing of steps 43 to 47 is performed on each of the pixels of the image sensor. In step 43, the processing unit 100 determines whether a target pixel is a G pixel and then proceeds to step 44 if the target pixel is the G pixel or proceeds to step 45 if the target pixel is not the G pixel. In step 44, the output value of the target pixel is compensated using the compensation value (rate of decrease in the illumination) of the target pixel (G pixel) stored in step 34 of FIG. 12. In step 45, the processing unit 100 determines whether a target pixel is an R pixel and then proceeds to step 46 if the target pixel is the R pixel or proceeds to step 47 if the target pixel is not the R pixel. In step 46, the output value of the target pixel is compensated using the compensation value of the target pixel (R pixel) stored in step 36 of FIG. 12. In step 47, the output value of the target pixel is compensated using the compensation value of the target pixel (B pixel) stored in step 37 of FIG. 12. Thus, the decrease in the illumination of each of the pixels caused by the image fibers is compensated.

FIG. 13B is a flowchart of demosaicing processing in a case in which the image sensor has a color filter. The processing is performed after the processing of FIG. 13A. Before the processing, the illumination of a color of light received by each of the pixels has been already compensated, and the illumination of colors of light that has not been received is interpolated using the compensated illumination. By the loop of steps 51 and 57, the processing of steps 52 to 56 is performed on each of the pixels of the image sensor. In step 52, the processing unit 100 determines whether a target pixel is a G pixel and then proceeds to step 53 if the target pixel is the G pixel or proceeds to step 54 if the target pixel is not the G pixel. In step 53, the processing unit 100 calculates the illumination of red (R) of the target pixel (G pixel) by interpolating the compensated illumination of R pixels adjacent to the target pixel. Similarly, the processing unit 100 calculates the illumination of blue (B) of the target pixel (G pixel) by interpolating the compensated illumination of B pixels adjacent to the target pixel. In step 54, the processing unit 100 determines whether a target pixel is an R pixel and then proceeds to step 55 if the target pixel is the R pixel or proceeds to step 56 if the target pixel is not the R pixel. In step 55, the processing unit 100 calculates the illumination of green (G) of the target pixel (R pixel) by interpolating the compensated illumination of G pixels adjacent to the target pixel. Similarly, the processing unit 100 calculates the illumination of blue (B) of the target pixel (R pixel) by interpolating the compensated illumination of B pixels adjacent to the target pixel. In step 56, the processing unit 100 calculates the illumination of green (G) of the target pixel (B pixel) by interpolating the compensated illumination of G pixels adjacent to the target pixel. Similarly, the processing unit 100 calculates the illumination of red (R) of the target pixel (B pixel) by interpolating the compensated illumination of R pixels adjacent to the target pixel. With the above processing, the illumination of red (R), green (G), and blue (B) of all the pixels is obtained. Note that any interpolation method such as nearest neighbor interpolation, linear interpolation, secondary interpolation, polynomial interpolation, cubic interpolation, and spline interpolation may be used as the interpolation.

Example 8

Figure 14:
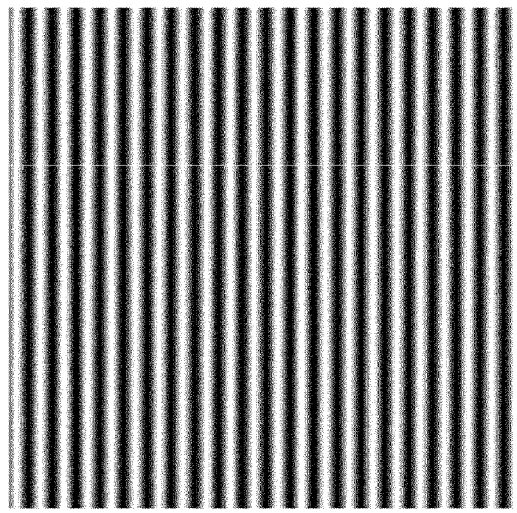
FIG. 14 is a diagram showing an example of a compensation result in Example 8.

The effectiveness of compensating illumination unevenness in the fourth embodiment was verified in a simulation. The arrangement of a color filter was based on the Bayer arrangement shown in FIG. 11. The parameters shown in table 2 were used. The illumination of red (R) of a G pixel was set to be an average of the compensated illumination of R pixels (two right and left R pixels) most adjacent to the G pixel. The illumination of other colors was calculated in the same way. However, the illumination of green (G) of an R pixel and the illumination of green (G) of a B pixel were each set to be an average of the compensated illumination of four most adjacent G pixels in vertical and horizontal directions. FIG. 14 shows an image having compensated illumination unevenness according to the Example. It was confirmed that the quality of the obtained image was satisfactory under person's visual observation.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-101221, filed on May 13, 2013 and Japanese Patent Application No. 2014-53760, filed on Mar. 17, 2014, which are hereby incorporated by reference herein in their entirety.

What is claimed is:

1. An imaging apparatus comprising:
   an image forming optical system;
   an image sensor including a plurality of pixels;
   an image fiber including a plurality of optical fibers that guides light from the image forming optical system to the image sensor; and
   a processing unit that applies processing for compensating for illumination unevenness of the image sensor caused by the image fiber, wherein
   at least some of light propagating inside a first one of the optical fibers and at least some of light propagating inside a second one of the optical fibers are guided to one of the pixels.

2. The imaging apparatus according to claim 1, wherein the illumination unevenness occurs when a positional relationship between an outgoing end face of a core of the optical fiber and the pixel is different for each of the pixels.

3. The imaging apparatus according to claim 1, wherein the processing unit compensates illumination of a target pixel to be compensated, by multiplying an output value of the target pixel by a compensation value corresponding to the target pixel.

4. The imaging apparatus according to claim 3, wherein the compensation value corresponding to the target pixel is set on the basis of an output value obtained from the target pixel, when an image of a subject having known illumination distribution is taken by the imaging apparatus.

5. The imaging apparatus according to claim 3, wherein the compensation value corresponding to the target pixel is set on the basis of an overlapping rate between an outgoing end face of a core of the optical fiber and the target pixel in a case where the outgoing end face of the core and the target pixel are projected on a projection face orthogonal to an optical axis.

6. The imaging apparatus according to claim 1, wherein the processing unit compensates illumination of a target pixel to be compensated, using an output value of the target pixel and an output value of a pixel adjacent to the target pixel.

7. The imaging apparatus according to claim 6, wherein the processing unit compensates illumination of a target pixel to be compensated by using a value obtained by interpolating output values of a plurality of adjacent pixels of the target pixel.

8. The imaging apparatus according to claim 7, wherein a compensation value of the target pixel is determined in such a way that the value obtained by interpolating the output values of the plurality of adjacent pixels is multiplied by a coefficient corresponding to the target pixel.

9. The imaging apparatus according to claim 8, wherein the coefficient is set on the basis of an output value obtained from the target pixel when an image of a subject having known illumination distribution is taken by the imaging apparatus.

10. The imaging apparatus according to claim 4, wherein the subject having the known illumination distribution is a subject having even illumination.

11. The imaging apparatus according to claim 9, wherein the subject having the known illumination distribution is a subject having even illumination.

12. The imaging apparatus according to claim 1, wherein the processing unit compensates an output value of each of the pixels such that compensated illumination of each of the pixels falls within ±10% of an average of compensated illumination of all the pixels when an image of a subject having even illumination is taken.

* * * * *